J. W. GRAYDON,
Assignor to THE GRAYDON SAFETY RAILROAD CAR HEATING CO.
Railroad Car Heating Apparatus.
No. 9,587. Reissued Feb. 22, 1881.
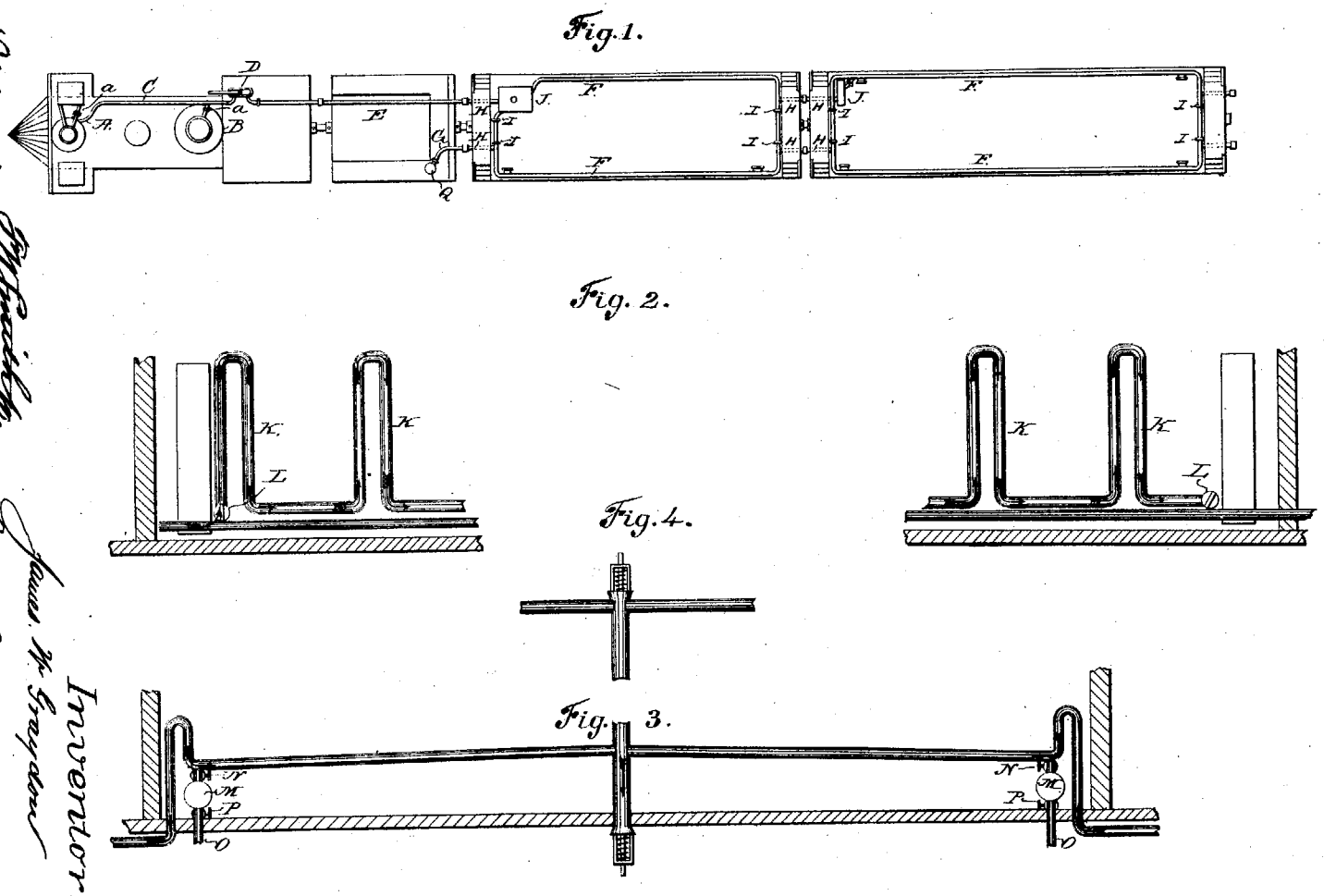
Attest: F. M. Smith Jr.
John F. C. Reinhart
Inventor:
James W. Graydon
By Atty Wm C. R. W. Fritz
THE NORRIS PETERS CO., PHOTO-LITHO., WASHINGTON, D. C.

UNITED STATES PATENT OFFICE.

JAMES W. GRAYDON, OF WASHINGTON, D. C., ASSIGNOR TO THE GRAYDON SAFETY RAILROAD CAR HEATING COMPANY, OF SAME PLACE.

RAILROAD-CAR HEATING APPARATUS.

SPECIFICATION forming part of Reissued Letters Patent No. 9,587, dated February 22, 1881.

Original No. 212,375, dated February 18, 1879. Application for reissue filed January 7, 1881.

*To all whom it may concern:*

Be it known that I, JAMES W. GRAYDON, of Washington, District of Columbia, have invented certain new and useful Improvements in the Method of and Apparatus for Heating Railroad-Cars, of which the following is a description.

My invention relates to certain improvements in the method and apparatus for heating cars with a portion of the exhaust or surplus steam from the locomotive.

Prior to my invention, and so far as I am aware, the only departures made from the original mode of heating railroad-cars by the use of independent wood or coal stoves located in each car consisted in the employment of water heating and circulating apparatus arranged in each individual car, and the utilization of hot water or steam from the boiler conducted by pipes from one car to another. The former method required a separate heating device located in each car and the care of an attendant to keep the fire up, &c., involving considerable labor and expense. In the latter method the arrangement of conducting and heating pipes has always been such that the steam or hot water used as the heating agent was deprived of complete circulation by reason of the fact that the connection between each successive car and the source of supply has been through a single pipe or conduit, so that great difficulty has been experienced in preventing freezing, either of the water, which, when hot, is used as a heating agent, or the products of condensation where steam has been used.

In addition to the methods referred to, it has been suggested to supply each car with a system of pipes to receive steam on one side and deposit the products of condensation on the other side through the medium of float-valves or traps, and to convey the hot waters of condensation to air-tight tanks, and thence to supply the boiler. This plan, for its successful operation, involves the absolute necessity of condensation, and necessarily prevents a complete circulation of the steam, as the traps or valves are so constructed that they will only lift in the presence of water, being kept closed by the steam when there is no water.

The objects of my invention are to dispense with the necessity of separate heating apparatus for each individual car, and to provide a means by which a series of cars may be heated from a single source, and at the same time to avoid the disadvantages resulting from the absence of a complete circulation; and with these objects in view my invention consists in the method and apparatus, hereinafter in detail described, for heating two or more cars by means of steam obtained from a single source and circulated through a system of pipes so arranged as to permit of a perfect or complete circuit of the heating agent, or, in other words, passing the heating agent from its source through two or more cars and back.

In order that others may fully understand my invention and learn how to practice the same with advantage, I will proceed to describe the manner in which the results are obtained, referring by letters to the accompanying drawings, in which—

Figure 1 is a top or plan view of a locomotive and two cars, showing the means by which the heating agent is taken from the engine and circulated through the train. Fig. 2 is a horizontal longitudinal section of a car, showing arrangements of heating-pipes in a car on one side. Fig. 3 is a vertical longitudinal section of a car, showing supply-pipes and water-receivers; and Fig. 4, a detail view of a safety-valve arranged on top or underneath the car.

Similar letters of reference denote like parts in the several figures.

A is the exhaust-pipe from the locomotive, and B the safety-valve, from one or both of which steam may be taken by the conduit-pipe C, through suitable connections, to a pump, D, by which it is forced through a pipe, E, to circulating-pipes F, arranged, as shown, in each car, and from thence back to the water-tank or source of water-supply by the pipe G. The pipes F are arranged, as shown, to travel completely around each car on the inside, and are provided at each end of the car with connecting-pipes H H. (Shown in dotted lines at Fig. 1.)

I I represent stop-valves arranged in each end portion of the circulating-pipes F, and between the connecting-pipes H H, whereby the circulation may be controlled, as will be presently explained.

J are reservoirs or tanks, which may be arranged in one corner of each car and suitably connected with the circulating-pipe F by stop-valves, so that any extra amount of steam may be supplied at suitable pressure, to be used during any temporary detachment of the cars from one another.

K are heating-pipes, arranged, as shown, to conduct heat to desired points, and connected with the supply-pipes F by stop-valves L. The supply-pipes F and heating-pipes K have an inclination from the center of each car toward the end, where connection is made with water-receivers M, provided with stop-valves N between the supply-pipes and the receivers, whereby, if necessary, any water in the pipes resulting from condensation may, if desirable, be conveyed to the receivers, and thence by pipes O and valves P discharged.

The safety-valve shown at Fig. 4 is applied to the conduit-pipe to relieve the same of any excessive pressure.

The pump D may be worked by joining its connecting-rod to a suitable working part of the engine.

The connecting-pipes H H of each car are joined by suitable flexible connections underneath the platforms.

Q is a spring-valve arranged in the return-pipe G to open at any desired pressure.

*a a* are valves arranged in the exhaust and safety-valve pipes to control or regulate the supply to the pipe C.

The operation of the apparatus is as follows: When the exhaust-steam can be spared, or the surplus steam is discharged from the safety-valve, the valves *a a* are opened, the pump draws the steam through the pipe C, and forces it through the pipe E to the circulating-pipes F along one side of the cars, then across the rear end of the rear car, and then back on the opposite side of the cars. The connecting-pipes H are used to complete the circuit by opening the stop-valves at the end of the rear car, and closing those in the ends of all the other cars composing the train. When there is more exhaust and surplus steam than is needed to heat the cars, it can be blown through the whole circuit to the water-tank in the tender, and be utilized to raise the temperature of the feed-water. In case of collision or other accident, the safety-valves will relieve the pipes of all steam contained therein, as heretofore described.

I am aware that it is not new, broadly, to heat cars by the use of steam or hot water conveyed to radiating-pipes, as alluded to in the beginning of my specification; but I am not aware that either have ever been used in such manner as to secure a complete circuit or circulation through more than one car. I do not therefore wish to claim, broadly, the use of steam or water as a heating agent in cars; but

What I claim as new is—

1. The mode of heating two or more cars with steam obtained from the locomotive-boiler, consisting in forcing said steam through pipes down one side of each car and back on the other side, the circulation being unobstructed from one car to another, whereby a complete circulation is made, substantially as and for the purposes set forth.

2. As an apparatus for carrying out the mode described of heating by circulation, a circuit of pipes in each car, provided at each end with two connecting-pipes, extending through the wall of the car, and intermediate regulating stop-valves, substantially as hereinbefore set forth.

3. The combination and arrangement of the pipes A C E F G, and means for forcing steam therein, substantially as and for the purpose set forth.

4. The system of circulating-pipes, substantially as described, in combination with stop-valves N, for controlling and directing the circulation, as hereinbefore set forth.

5. In combination with the circulating and heating pipes, a reservoir connected therewith adapted to supply steam independently of the boiler, as hereinbefore set forth.

In testimony whereof I have hereunto set my hand and seal this 23d day of December, A. D. 1880.

JAMES W. GRAYDON. [L. S.]

In presence of—

WM. C. MCINTIRE,

F. W. SMITH, Jr.